United States Patent

Craychee et al.

(10) Patent No.: US 10,245,654 B2
(45) Date of Patent: Apr. 2, 2019

(54) TRUCK CLUTCH BRAKE CUTTER

(71) Applicants: Geoffrey S. Craychee, Schaumburg, IL (US); John F. Craychee, St. Charles, IL (US)

(72) Inventors: Geoffrey S. Craychee, Schaumburg, IL (US); John F. Craychee, St. Charles, IL (US)

( * ) Notice: Subject to any disclaimer, the term of this patent is extended or adjusted under 35 U.S.C. 154(b) by 348 days.

(21) Appl. No.: 15/237,186

(22) Filed: Aug. 15, 2016

(65) Prior Publication Data

US 2017/0050247 A1 Feb. 23, 2017

Related U.S. Application Data

(60) Provisional application No. 62/282,944, filed on Aug. 17, 2015.

(51) Int. Cl.
  *B23B 47/00* (2006.01)
  *B23B 47/28* (2006.01)
  *B25B 27/00* (2006.01)

(52) U.S. Cl.
  CPC ........ *B23B 47/281* (2013.01); *B25B 27/0064* (2013.01); *B23B 2247/12* (2013.01)

(58) Field of Classification Search
  CPC .............. B23B 47/281; B23B 2247/12; B25B 27/0064
  See application file for complete search history.

(56) References Cited

U.S. PATENT DOCUMENTS

| | | | |
|---|---|---|---|
| 1,396,891 A | | 11/1921 | Short |
| 1,505,834 A | * | 8/1924 | Westendorf ......... B25B 27/0064 29/259 |
| 1,686,352 A | | 10/1928 | Sweet |
| 2,863,537 A | | 12/1958 | Root |
| 3,019,680 A | * | 2/1962 | Daugherty ............ E21B 19/164 192/45.1 |
| 3,202,247 A | | 8/1965 | Schmidt et al. |
| 3,313,330 A | * | 4/1967 | Hoch ..................... A01F 29/14 188/77 R |

(Continued)

OTHER PUBLICATIONS

Prusa, Dennis Prusa presented tool to Kiene Diesel of Chicago in 2003.

(Continued)

*Primary Examiner* — Richard Chang
(74) *Attorney, Agent, or Firm* — Robert J. Harter; www.bobharter.com

(57) ABSTRACT

A clutch brake cutter for removing a disk-shaped clutch brake from off an input shaft that couples a truck engine to a transmission includes one or more cutting tools and employs a method of clamping and axially compressing a solid or multilayer clutch brake during the cutting operation. In some examples, the clutch brake cutter first guides a drill bit radially from an outer peripheral edge to an inner peripheral edge of the clutch brake. The resulting hole has a diameter that is less than the disk thickness of the clutch brake. Next, the clutch brake cutter guides a chisel lengthwise through the predrilled hole to split the hole open. The drilling and chiseling operation is repeated at an opposite location on the clutch brake to separate the clutch into at least two pieces that can be readily removed from the input shaft without having to first remove the transmission.

14 Claims, 13 Drawing Sheets

(56) References Cited

U.S. PATENT DOCUMENTS

| | | | | |
|---|---|---|---|---|
| 4,375,341 | A | * | 3/1983 | Schulze .................. B23B 47/28 |
| | | | | 408/111 |
| 4,512,450 | A | | 4/1985 | Babcock |
| 4,656,715 | A | * | 4/1987 | Diaz ................... B25B 27/0064 |
| | | | | 29/259 |
| 4,667,799 | A | | 5/1987 | Kummer |
| 4,712,659 | A | | 12/1987 | Flotow |
| 5,076,406 | A | | 12/1991 | Gregory et al. |
| 5,531,306 | A | | 7/1996 | Mason |
| 5,797,708 | A | * | 8/1998 | Bencic .................. B23B 47/281 |
| | | | | 408/103 |
| 5,807,033 | A | * | 9/1998 | Benway ................ B23B 47/288 |
| | | | | 144/346 |
| 6,450,310 | B1 | | 9/2002 | Catrinta |
| 7,849,574 | B2 | * | 12/2010 | Dickinson ............. F16H 57/023 |
| | | | | 29/252 |
| 8,096,394 | B2 | | 1/2012 | Settles et al. |
| 9,969,011 | B1 | * | 5/2018 | Marusiak .............. B23B 47/287 |
| 2003/0068207 | A1 | * | 4/2003 | Sarh ........................ B23B 47/28 |
| | | | | 408/1 R |
| 2010/0243072 | A1 | * | 9/2010 | McGraw ................. E21B 29/12 |
| | | | | 137/15.13 |

OTHER PUBLICATIONS

Symon, Pet Symon presented tool to Kiene Diesel of Chicago in 2004.
Ankney, Randy Ankney presented tool/fixture to Kiene Diesel of Chicago in 2012.

* cited by examiner

FIG. 2
FIG. 3
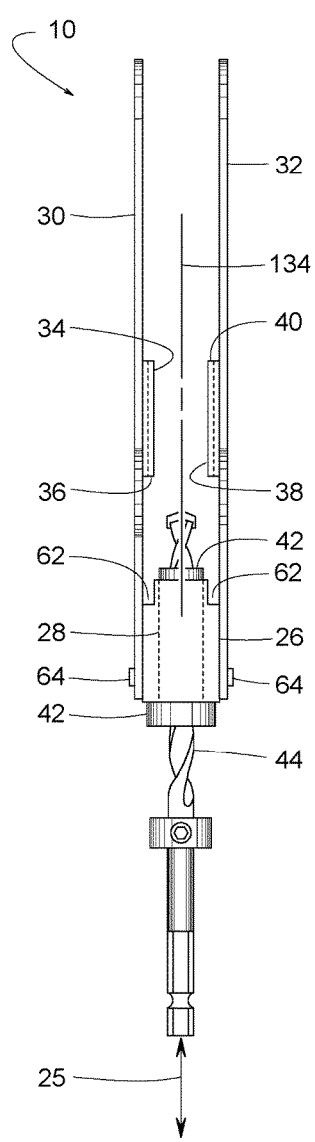
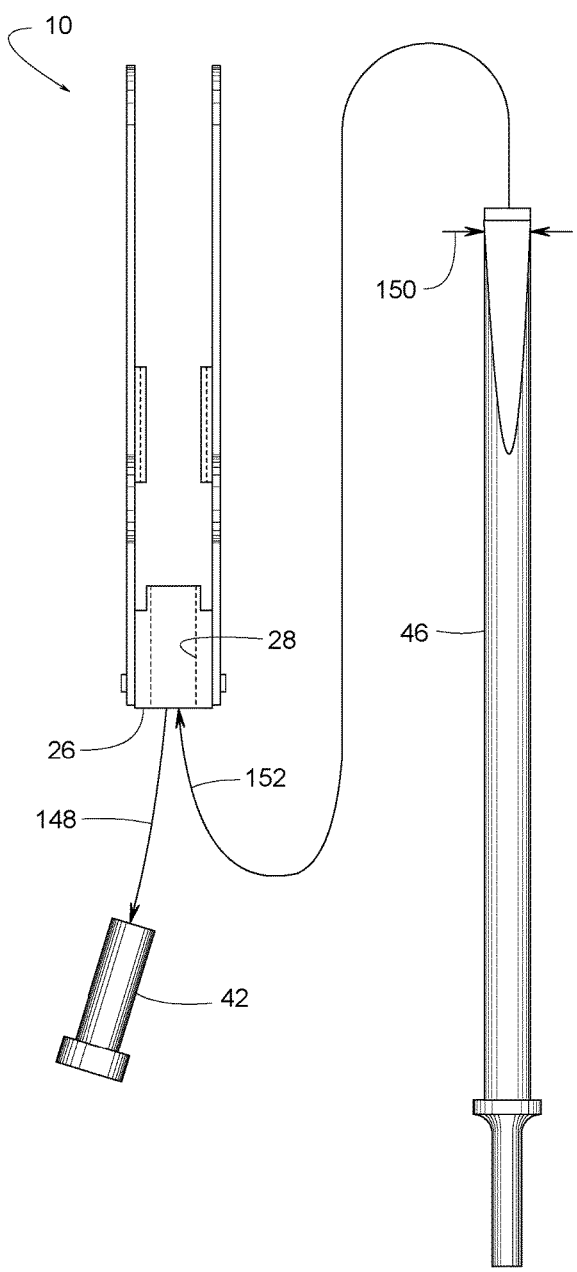

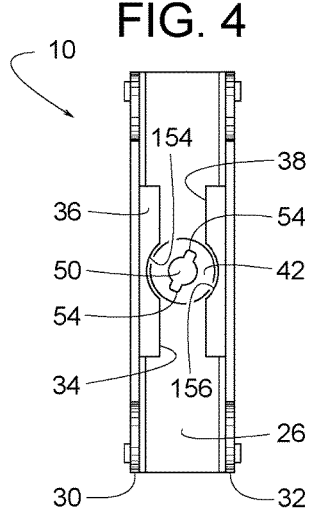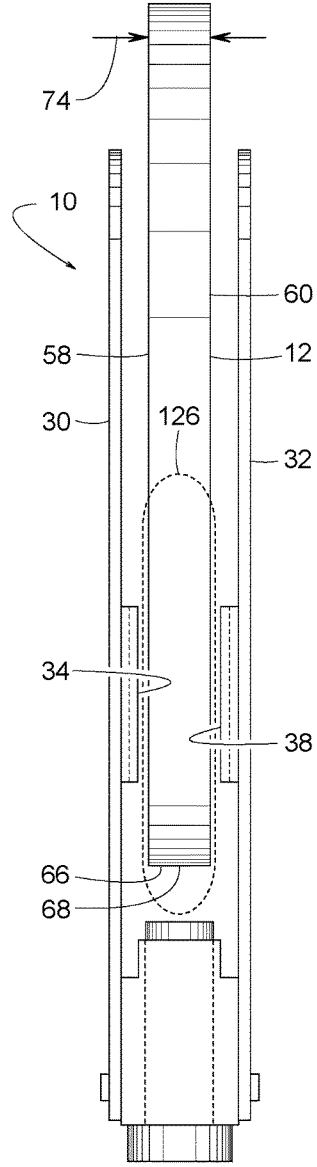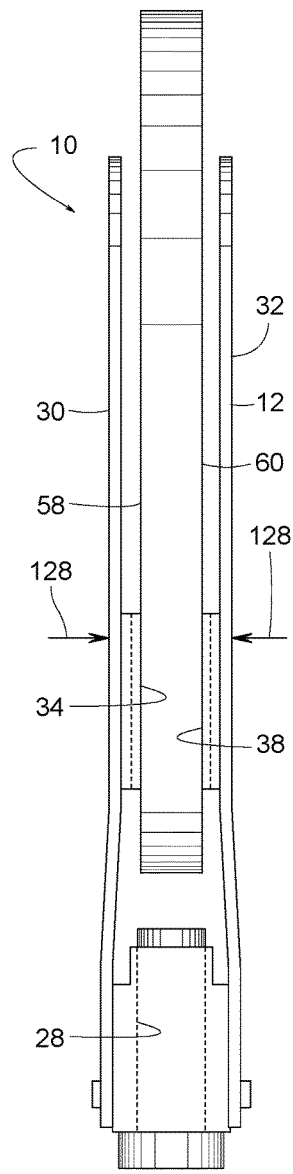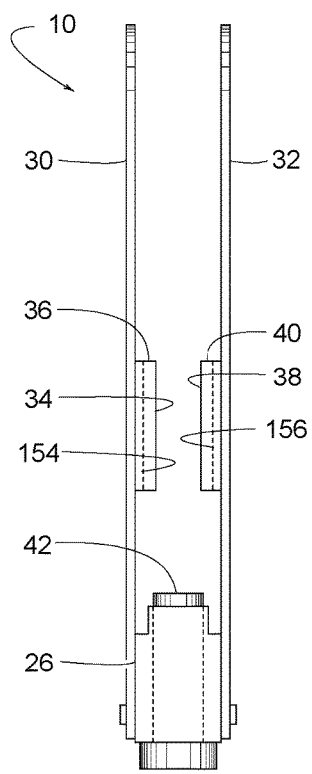

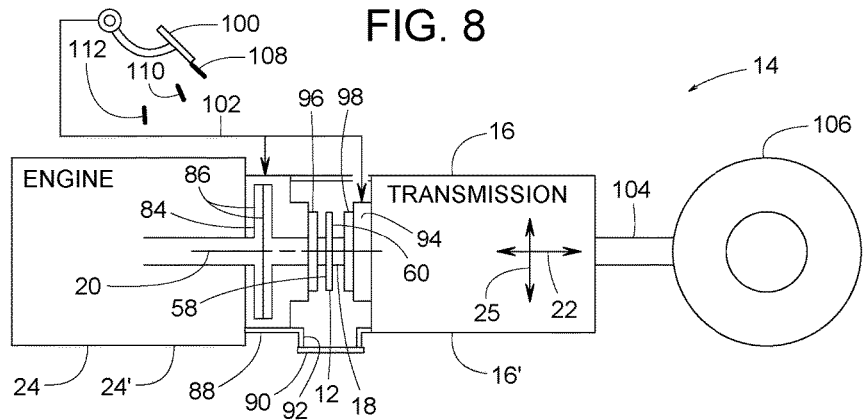
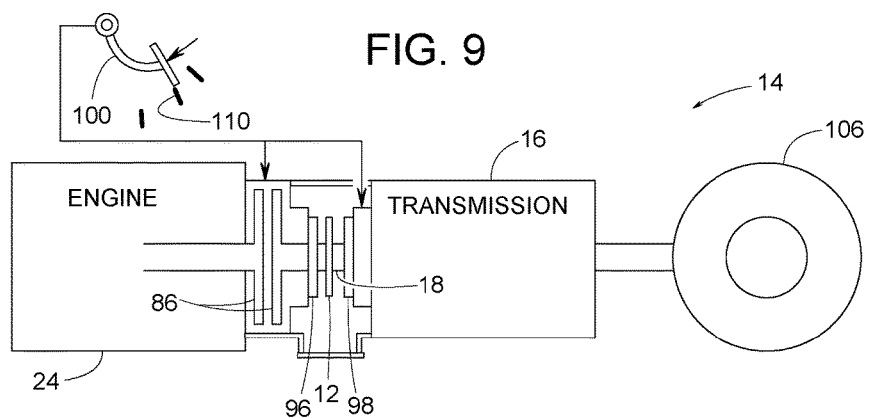
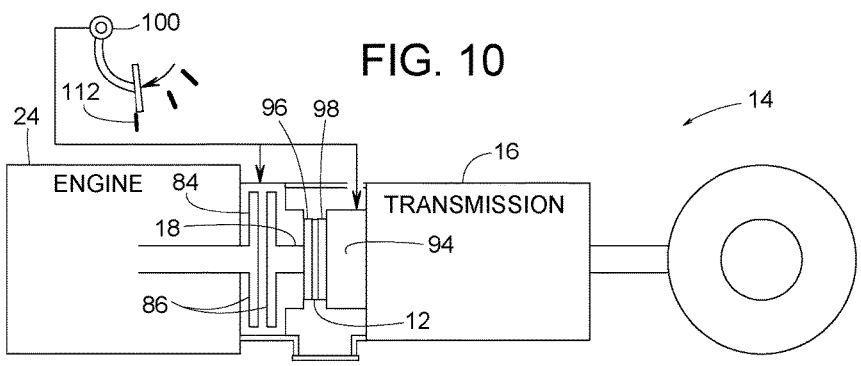

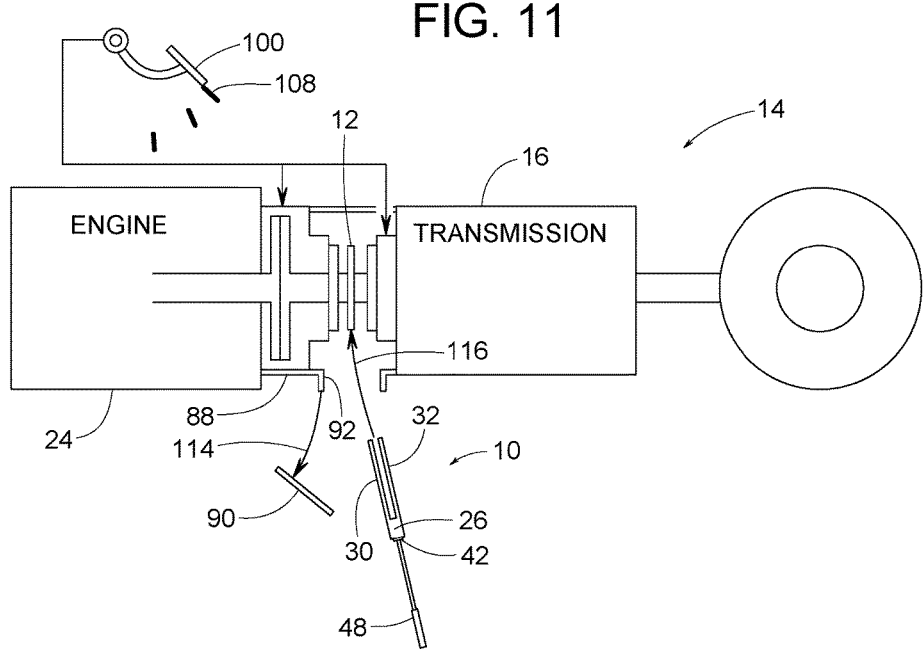
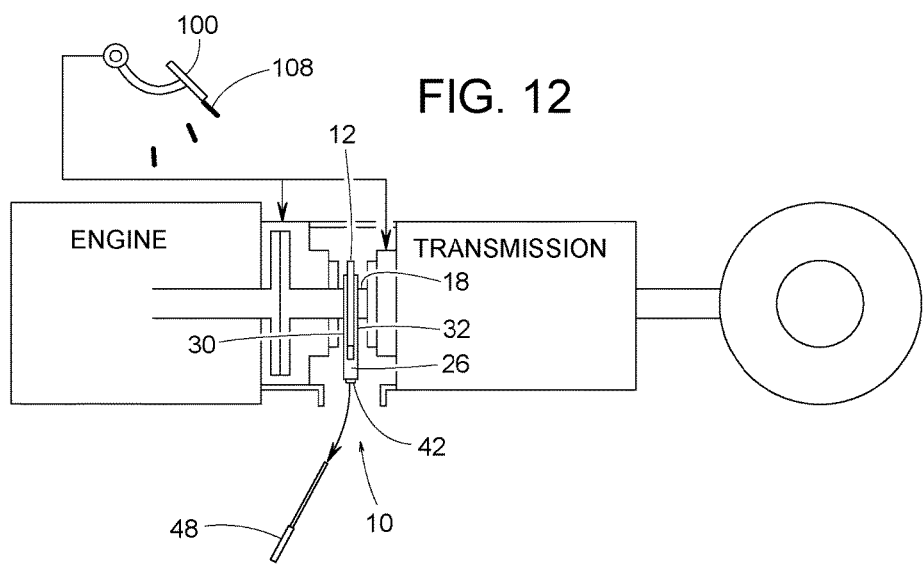

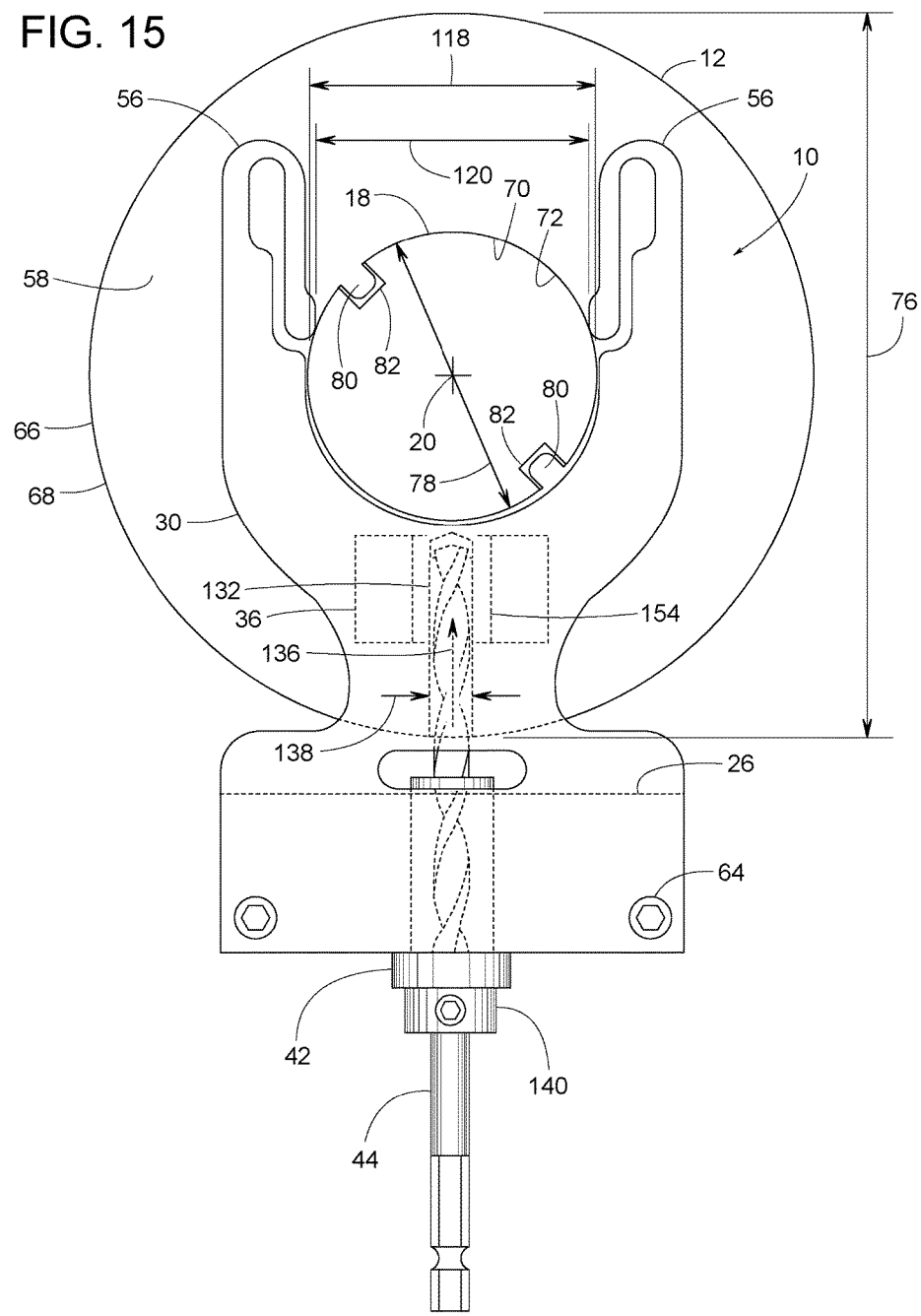

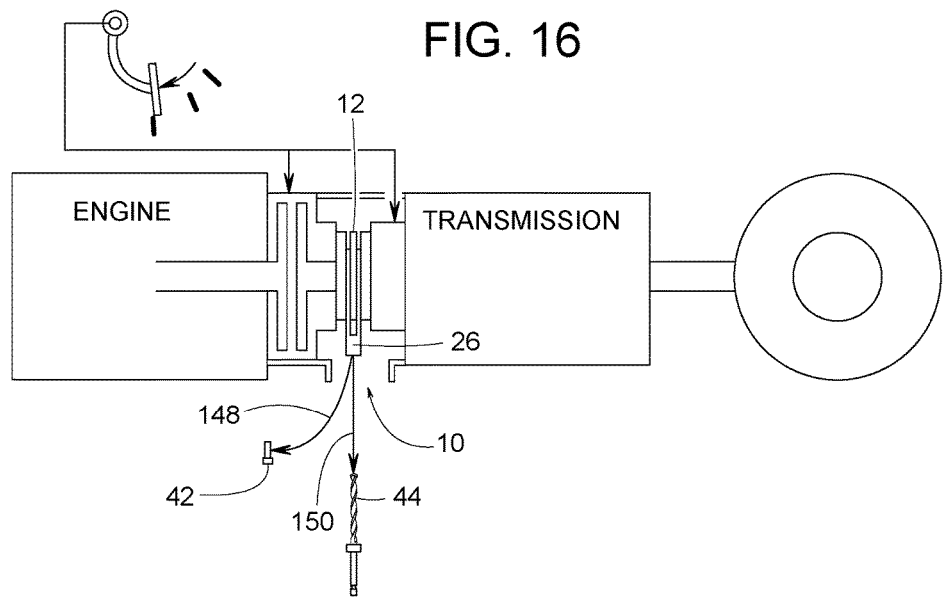
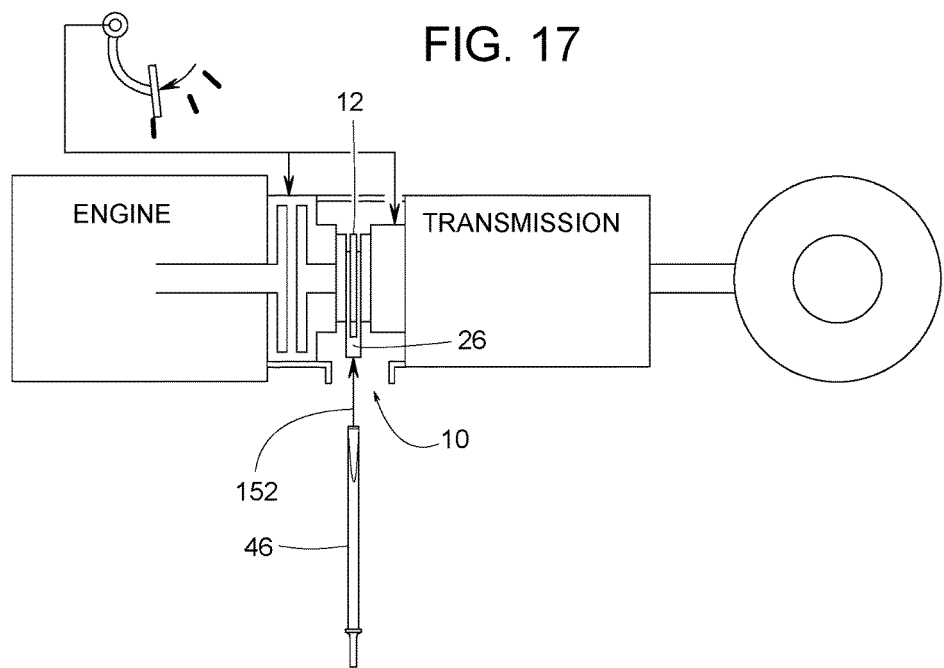

TRUCK CLUTCH BRAKE CUTTER

CROSS REFERENCE TO RELATED APPLICATIONS

This application claims the benefit of provisional patent application Ser. No. 62/282,944 filed on Aug. 17, 2015 by the present inventors and is specifically incorporated herein by reference.

FIELD OF THE DISCLOSURE

This disclosure generally pertains to truck clutch brakes and more specifically to a tool and method for removing truck clutch brakes.

BACKGROUND

Large, heavy duty trucks often include a key-slotted input shaft that conveys power from an engine to a non-synchronous transmission. A drive shaft, in turn, conveys the power from the transmission to one or more drive wheels that move the truck over the road. To aide in shifting gears, a conventional clutch typically couples the engine to the input shaft. To smoothen the shift action of the transmission, a clutch pedal in the cabin of the truck can be partially depressed to disengage the conventional clutch. With some trucks, fully depressing the clutch pedal, or pressing a separate pushbutton on the transmission shift lever, engages what is known as a clutch brake. When engaged, a clutch brake slows or stops the rotation of the input shaft, which allows a non-synchronous transmission to be shifted when the engine is rotating while the truck is stationary.

A typical clutch brake is an annular disk with frictional wear-resistance faces. The clutch brake encircles the input shaft and is keyed to it such that the clutch brake can slide along the input shaft in an axial direction. In the rotational direction, however, the keyed connection causes the clutch brake and the input shaft to rotate and stop as a unit. To stop the rotation of the clutch brake and thus stop the rotation of the input shaft, fully depressing the clutch pedal forces an axially movable but rotationally stationary clutch plate against one face of the clutch brake. The axially movable clutch plate is usually part of a throw-out bearing housing mounted between the conventional clutch and the clutch brake. Upon fully depressing the clutch pedal (or depressing an equivalent pushbutton), the clutch brake becomes sandwiched and clamped between the axially movable clutch plate and an opposing stationary clutch plate. The stationary clutch plate is usually between the clutch brake and the transmission and is sometimes referred to as a transmission bearing retainer cap. Frictional force between the clutch brake and the two adjacent clutch plates is what slows or stops the rotation of both the clutch brake and the input shaft.

In examples where the clutch brake is a continuous disk extending circumferentially uninterrupted around input shaft 4, it can be very time consuming to replace a worn or otherwise defective clutch brake. Replacement often involves having to first remove the transmission so that the original clutch brake can be slid axially off one end of the input shaft. Some clutch brakes have a pivotal or separable joint that facilitate replacement without having to remove the transmission. Such clutch brakes, however, are not always provided by the original truck manufacturer, and some separable clutch brakes can be easier to install than to remove.

BRIEF DESCRIPTION OF THE DRAWINGS

FIG. 2 is a side view of the clutch brake cutter shown in FIG. 1.
FIG. 3 is a side exploded view of the clutch brake cutter shown in FIG. 1.
FIG. 4 is a top view of FIG. 5.
FIG. 5 is a side view similar to FIG. 2 but with the drill bit omitted.
FIG. 6 is a side view similar to FIG. 5 but enlarged and showing an example clutch brake installed between a pair of unclamped plates of the clutch brake cutter.
FIG. 7 is a side view similar to FIG. 6 but showing a clamping force bending the clutch brake cutter's plates and axially compressing an example clutch brake.
FIG. 8 is a schematic view of an example vehicle that includes an example clutch brake and a clutch pedal, wherein the clutch pedal is in a released position.
FIG. 9 is a schematic view similar to FIG. 8 but showing the clutch pedal in a shift position.
FIG. 10 is a schematic view similar to FIG. 8 but showing the clutch pedal (or equivalent clutch brake switch) in a brake position.
FIG. 11 is a schematic view similar to FIG. 8 but showing an inspection cover being removed and showing the clutch brake cutter of FIG. 1 being installed.
FIG. 12 is a schematic view similar to FIG. 11 but showing a handle being removed from clutch brake cutter's main body.
FIG. 15 is a front face view of the clutch brake cutter and the clutch brake shown in FIG. 14.
FIG. 16 is a schematic view similar to FIG. 14 but showing the drill bit and the drill bushing being removed.
FIG. 17 is a schematic view similar to FIG. 16 but showing a chisel being inserted in the tool-receiving hole of the clutch brake cutter.

DETAILED DESCRIPTION

Figure 22:
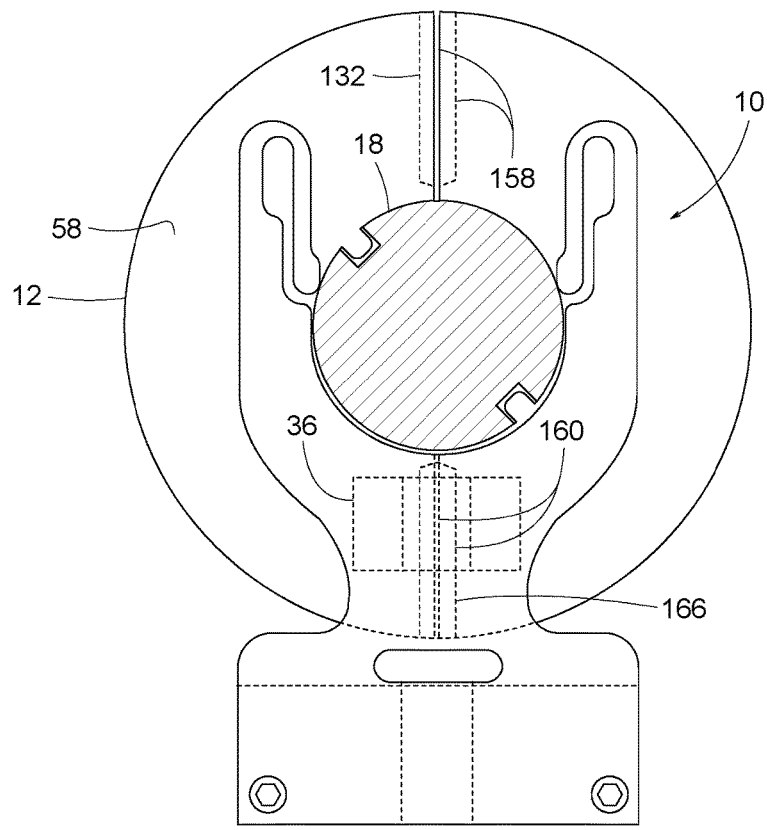
FIG. 22 is a front face view showing the clutch brake with two cuts approximately 180 degrees from each other.
Figure 23:
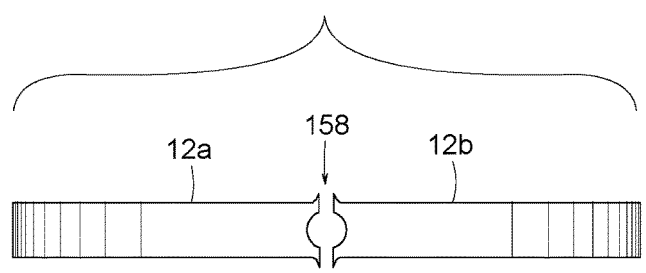
FIG. 23 is a top view of the cut clutch brake shown in FIG. 22.
Figure 24:
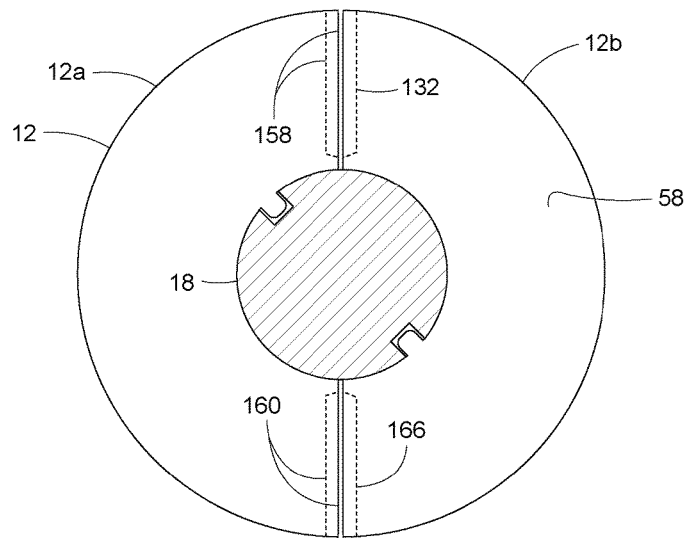
FIG. 24 is a front face view similar to FIG. 22 but with the clutch brake cutter removed.
Figure 25:
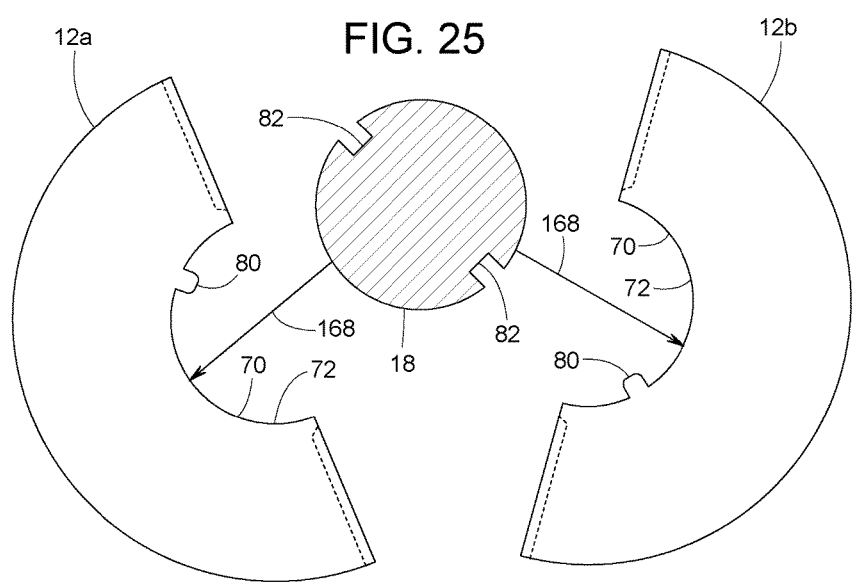
FIG. 25 is a front face view similar to FIG. 24 but showing the cut clutch brake separated and being removed from the input shaft.

FIGS. 1-25 show an example of a clutch brake cutter 10 and method of using it for removing a worn or otherwise damaged clutch brake 12 from a vehicle 14 (e.g., a heavy duty truck), and doing so without having to remove the vehicle's transmission 16 (FIG. 8). Clutch brake 12 (FIG. 24) is a known component in the general shape of an annular disk having an inner periphery keyed to an input shaft 18. Input shaft 18 has a rotational axis 20 for transmitting power in an axial direction 22 between the vehicle's engine 24 and transmission 16. Axial direction 22 is perpendicular to a radial direction 25 (FIGS. 2 and 3). Clutch brake 12 is relied upon for frictionally braking the rotation of shaft 18, particularly when vehicle 14 is parked with engine 24 idling. FIGS. 1-5 show clutch brake cutter 10 itself; FIGS. 8-10 show vehicle 14 under normal operation; FIGS. 6, 7 and 11-22 show various views and configurations of clutch brake cutter 10 with reference to clutch brake 12; and FIGS. 23-25 show clutch brake 12 after being cut apart by clutch brake cutter 10.

Figure 1:
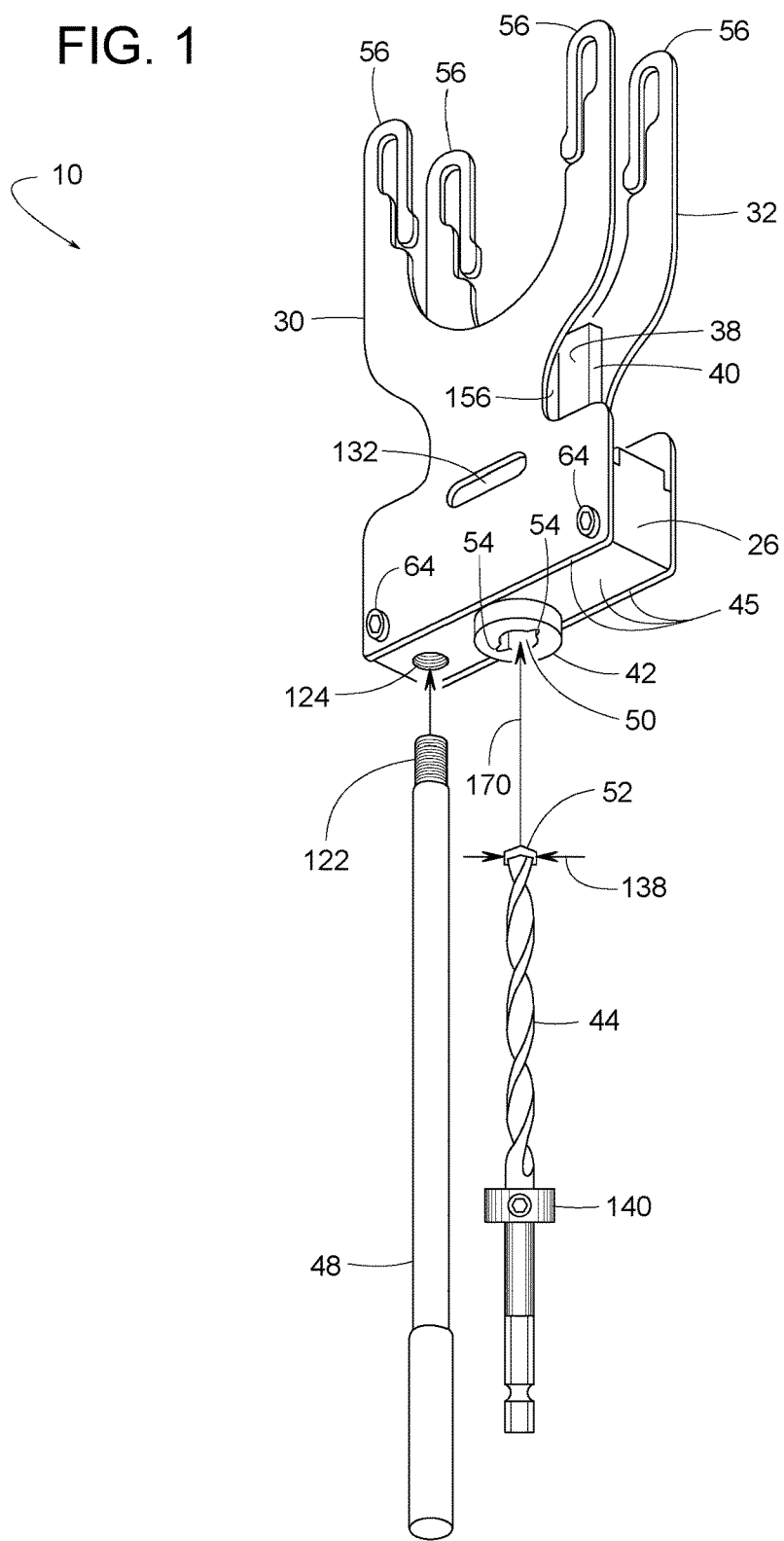
FIG. 1 perspective exploded view of an example clutch brake cutter constructed in accordance with the teachings disclosed herein.

In the illustrated example, clutch brake cutter 10 comprises a main body 26, a tool-receiving hole 28 in main body 26, a first plate 30, a second plate 32, a first clamping surface 34 (e.g., on a first clamping pad 36), a second clamping surface 38 (e.g., on a second clamping pad 40), a drill bushing 42, a drill bit 44, a chisel 46, and a removable handle 48. A clutch brake cutter body 45 of clutch brake cutter 10 comprises main body 26 plus plates 30 and 32. Tool receiving hole 28 has an inner diameter sized for receiving selectively drill bushing 42 and chisel 46 (FIG. 3). Drill bushing 42 has an inner hole 50 of a diameter sized for receiving drill bit 44 (FIGS. 1 and 15). In examples where drill bit 44 includes an enlarged carbide tip 52, inner hole 50 of bushing 42 has grooves 54 (FIG. 4) that provide clearance for tip 52 to pass through bushing 42. In examples where clutch brake 10 comprises a non-homogeneous assembly or stack of spring steel washers or other difficult to drill components, carbide tip 52 provides a suitable combination of hardness and toughness to drill through such a clutch brake.

In some examples, main body 26 and clamping surfaces 34 and 38 are made of steel for durability, and plates 30 and 32 are made of 18-gage spring steel sheet metal for resilient flexibility. In the illustrated example, each plate 34 and 38 has first and second fingers 56 that are resiliently flexible for readily snapping onto and off of shaft 18. In some examples, the resilient flexibility of plates 34 and 38 allow clutch brake cutter 10 to be clamped onto the clutch brake's front face 58 and back face 60 during the clutch brake removal process. Stress relief channels 62 in main body 26 provide additional clearance for plates 30 and 32 to flex. Screws 64, welding, or other known means are used for fastening plates 30 and 32 to main body 26. The same is true for fastening clamping pads 34 and 36 to plates 30 and 32.

In the example illustrated in FIGS. 6 and 15, clutch brake 12 is an annular disk comprising front face 58, back face 60, an outer edge 66 at an outer periphery 68, and an inner edge 70 at an inner periphery 72. FIG. 6 shows faces 58 and 60 being spaced apart from each other to provide clutch brake 12 with a thickness 74 of about 0.390 to 0.500 inches. FIG. 15 shows clutch brake 12 having an outer diameter 76 of about 4.5 inches and an inner diameter 78 of about 2 inches. To restrict relative rotation between clutch brake 12 and shaft 18, clutch brake 12 has two tabs 80 that protrude radially inward from the clutch brake's inner periphery 72 to engage mating grooves 82 in shaft 18, as shown in FIG. 15.

In a typical installation, clutch brake 10 is installed within vehicle 14, as shown in FIGS. 8-10. In this schematically illustrated example, vehicle 14 comprises engine 24 (including an engine block 24'), transmission 16 (including a transmission housing 16'), a conventional clutch 84 comprising a plurality of clutch disks 86, clutch brake 12, a clutch housing 88 (including a bell housing) containing clutch brake 12, a removable access cover 90 covering an inspection opening 92 of clutch housing 88 (e.g., covering inspection opening 92 of the bell housing), a clutch brake actuator 94 for selectively clamping clutch brake 12 between an input clutch plate 96 and an output clutch plate 98, a foot-operated clutch pedal 100 (i.e., a foot-operated clutch pedal alone or in combination with a clutch brake switch, such as a pushbutton on a transmission shift lever), a linkage mechanism 102 (e.g., mechanical linkage and/or hydraulic connection) coupling clutch pedal 100 and/or a clutch brake switch to both clutch 84 and clutch brake actuator 94, input shaft 18, a drive shaft 104, and one or more drive wheels 106 coupled to drive shaft 104. Input shaft 18 and clutch 84 couple engine 24 to transmission 16.

It should be noted that a clutch pedal for controlling both the conventional clutch and the clutch brake is equivalent to the combination of a dedicated clutch pedal for controlling only the conventional clutch plus a separate clutch brake switch on the transmission shift lever for controlling the clutch brake. In other words, in some examples, a clutch brake switch is one example subset of a clutch pedal. Consequently, when the present disclosure (e.g., Description and Claims) refers to depressing and releasing a clutch pedal for controlling both the conventional clutch and the clutch brake, such references encompass the equivalent example a dedicated clutch pedal for controlling the conventional clutch plus a separate clutch brake switch for controlling the clutch brake.

In the example illustrated in FIGS. 8-10, clutch pedal 100 is movable selectively to a released position 108, an intermediate shift position 110, and a fully depressed brake position 112. In the released position, as shown in FIG. 8, the plurality of clutch disks 86 are engaged to transmit power from engine 24, through input shaft 18, through transmission 16, through drive shaft 104, and onto drive wheel 106. In the released position, clutch brake 12 and input shaft 18 are free to rotate relative to clutch plates 96 and 98.

When clutch pedal 100 is manually depressed to intermediate shift position 110, as shown in FIG. 9, the plurality of clutch disks 86 disengage to substantially prevent the transmission of power from engine 24 to transmission 16. This allows the driver of vehicle 14 to shift transmission 16 while the gears of transmission 16 are generally unloaded. It should be noted that in intermediate shift position 110, clutch brake 12 and input shaft 18 are free to rotate relative to clutch plates 96 and 98, wherein such rotation may be driven by the rotation of drive wheel 106 as vehicle 14 is traveling.

When vehicle 14 is parked, idling or otherwise not traveling, manually depressing clutch pedal 100 to the fully depressed brake position 112, as shown in FIG. 10, disengages the plurality of clutch disks 86 and actuates clutch brake actuator 94. Clutch pedal 100 is schematically illustrated to represent various designs including, but not limited to, a clutch pedal itself for controlling both conventional clutch 84 and clutch brake actuator 94, and a clutch pedal for conventional clutch 84 plus a separate switch for controlling clutch brake actuator 74. In some examples, clutch brake actuator 94 is a known yoke and collar mechanism for moving clutch plate 98 in axial direction 22. Actuating clutch brake actuator 94 by fully depressing clutch pedal 100, or by depressing a separate clutch brake switch, forces output clutch plate 98 toward input clutch plate 96 to clamp clutch brake 12 between plates 96 and 98. Such clamping action slows or stops the rotation of clutch brake 12 and input shaft 18. Consequently, when clutch pedal 100 is fully depressed while vehicle 14 stationary, transmission 16, input shaft 18 and clutch brake 12 are also stationary while engine 24 is free to idle. This normal functionality of vehicle 14 lends itself well to the proposed method of removing a defective clutch brake 12 as disclosed herein.

Clutch plates 96 and 98 are schematically illustrated to represent any two surfaces that face the clutch brake's faces 58 and 60 and are able to engage them for the purpose of slowing or stopping the rotation of clutch brake 12 and shaft 18. In some examples, clutch plates 96 and 98 are able to engage clutch brake 12 by virtue of at least one of clutch plate 96 and 98 being axially movable along shaft 18. The illustrated example shows input clutch plate 96 being stationary while output clutch plate 98 is movable in response to clutch brake actuator 94. In other examples of vehicle 14, as shown in U.S. Pat. No. 8,096,394 (which is specifically incorporated by reference herein), output clutch plate 98 is stationary while input clutch plate 96 is movable in response to clutch brake actuator 94. As one clutch plate 96 or 98 moves axially toward the other, clutch brake 12 being free to slide axially along shaft 18 results in clutch brake 12 being clamped between clutch plates 96 and 98. Some examples of input clutch plate 96 are referred to in the industry as a release bearing housing or a throw-out bearing housing. Some examples of output clutch plate 98 are referred to as a transmission bearing retainer cap or a front end of the transmission.

To replace a worn, damaged or otherwise defective clutch brake 12, clutch brake cutter 10 can be used for removing the old clutch brake 12 by way of the example sequence shown in FIGS. 11-25. The following method steps serve as an example. The actual steps can be performed in the listed order, some steps can be performed in a different order, some steps may be omitted, and some steps may be repeated.

FIG. 11 shows access cover 90 being removed and clutch brake cutter 10 being installed while clutch pedal 100 is in released position 108. Arrow 114 represents removing access cover 90 from clutch housing 88 to open inspection opening 92. Arrow 116 represents moving main body 26 of clutch brake cutter 10 through inspection opening 92 prior to placing main body 26 at a first position proximate clutch brake 12. FIG. 11 also shows handle 48 being temporarily attached to main body 26 to aide in moving clutch brake cutter 10 through inspection opening 92.

Handle 48 also aides in manually installing clutch brake cutter 10 so that fingers 56 can resiliently flex in a horizontal radial direction to snap onto input shaft 18, thereby resiliently coupling main body 26 to shaft 18. The snap action is made possible by the shaft's outer diameter 78 (same as a strained distance 118 between fingers 56) being slightly greater than a relaxed separation distance 120 between fingers 56 (FIG. 15). Thus, manually pushing clutch brake cutter 10 onto shaft 18 forces fingers 56 to move from their relaxed distance 120 to their strained distance 118 and then back to their relaxed distance 120.

FIG. 12 shows the removal of handle 48 while main body 26 and plates 30 and 32 hang from shaft 18 (i.e., clutch brake cutter 10 is in a working position). FIG. 11 shows handle 48 in its installed position, and FIGS. 1 and 12 show handle 48 in its removed position. In the illustrated example, handle 48 is removed by unscrewing a threaded end 122 of handle 48 from a threaded hole 124 in main body 26. The removal of handle 48 provides clearance for later inserting drill bit 44 and chisel 46 through tool-receiving hole 28.

Clutch brake cutter 10 in an unclamped working position shown in FIG. 12 corresponds to the configuration shown in FIG. 6. In the unclamped configuration, as shown in FIG. 6, clamping surfaces 34 and 38 are spaced apart to define a clutch brake receiving area 126 having sufficient space to easily receive clutch brake 12.

Figure 13:
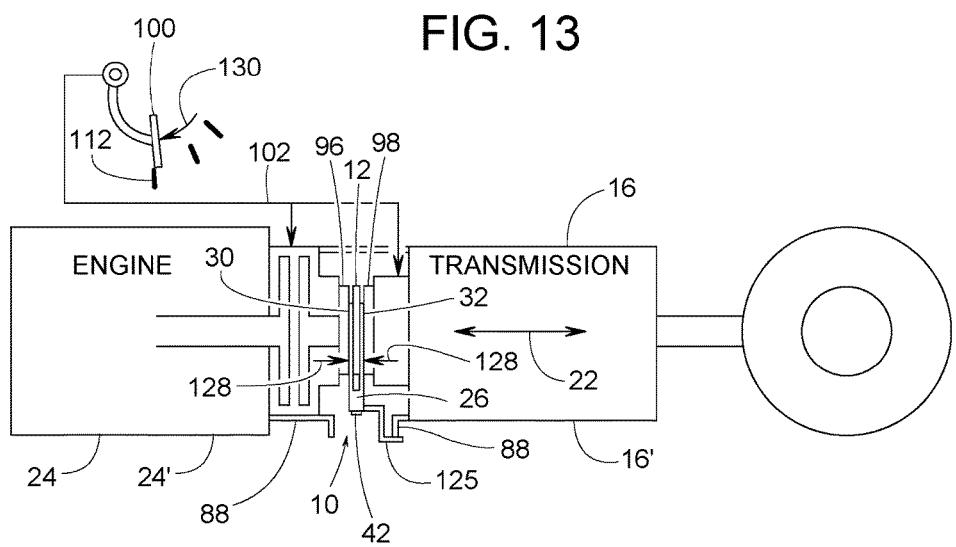
FIG. 13 is a schematic view similar to FIG. 12 but showing the clutch pedal (or equivalent clutch brake switch) in its brake position.

FIG. 13 shows clutch pedal 100 being fully depressed to securely clamp clutch brake cutter 10 in place between clutch plates 96 and 98. Clutch brake 10 being in the tightly clamped configuration of FIG. 13 is also shown in FIG. 7. When clutch brake 12 is later drilled, tightly clamping clutch brake 12 in axial direction 22 restricts clutch brake 10 from flexing or shifting in that direction; otherwise, even slight movement of clutch brake 10 in axial direction 22 during the drilling operation can break drill bit 44. In cases where clutch brake 12 is an assembly comprising one or more layers of steel rings, disks, thin hardened washers, and wear pads; a clamping force 128 compressing such a clutch brake in axial direction 22 squeezes the layers tightly together, thereby preventing the layered parts from moving in relation to each other. Attempting to drill through a non-homogeneous clutch brake without first securely clamping and compressing the layers together is extremely difficult and destructive to the cutting edge of the drill bit. This is due to the interrupted cutting and vibration of the layers which subjects the drill bit to repeated mechanical shock that can break a hard drill bit.

In addition or alternatively, some examples of clutch brake cutter 10 includes a bracket 125 for fastening clutch brake cutter body 45 to a stationary part of vehicle 14 to help hold clutch brake cutter body 45 steady while drilling or chiseling clutch brake 12. Securing clutch brake cutter body 45 can be particularly important in cases where tabs 80 have broken off, whereby clutch brake 4 is free to rotate around shaft 18. Examples of a stationary part of vehicle 14 include, but are not limited to, engine block 24', transmission housing 16' and clutch housing 88.

Arrow 116 of FIG. 11 represents attaching (e.g., affixing, clamping, holding, connecting, etc.) clutch brake cutter body 45 to clutch brake 12. Clutch plates 96 and 98 exerting clamping force 128 against plates 30 and 32, and bracket 125 connecting clutch brake cutter body 45 to clutch housing 88 are two examples of inhibiting rotation of clutch brake cutter body 45 relative to at least one of engine block 24', transmission housing 16' and clutch housing 88. Arrows 146 and 152 represent two examples of inserting a cutting tool (e.g., drill 44 or chisel 46) through tool-receiving hole 28 of clutch brake cutter body 45 and forcing the cutting tool in radial direction 25 into clutch brake 12 while inhibiting rotation of clutch brake cutter body 45.

Arrow 130, of FIG. 13, represents depressing clutch pedal 100, and arrows 128 represent transmitting clamping force 128 in axial direction 22 against the clutch brake's faces 58 and 60. In some examples, plates 30 and 32 and clamping surfaces 34 and 38 on clamping pads 36 and 40 transmit force 128 from clutch plates 96 and 98 to faces 58 and 60 of clutch brake 12. In some examples, clutch plates 96 and 98 are forced against clutch brake 12 by manipulating linkage mechanism 102 directly or by means other than by depressing clutch pedal 100. In some examples, wedges and/or shims between clutch brake 12 and clutch plates 96 and 98, or equivalent alternate tooling, can be used for axially clamping clutch brake 12, whereby clutch pedal 100 can be left in its released position.

In the example illustrated in FIGS. 6 and 7, clutch brake cutter 10 can transfer clamping force 128 from clutch plates 96 and 98 to faces 58 and 60 of clutch brake 12 because the resilient flexibility of plate 30 and/or 32 makes plates 30 and 32 movable relative to each other and makes at least one of the plates movable in axial direction 22 relative to clutch brake 12 and tool receiving hole 28. FIG. 7 shows clamping force 128 exerted against plates 30 and 32 bends or otherwise moves plates 30 and 32 toward each other. This movement forces clamping surfaces 34 and 38, of clamping pads 36 and 40, tightly against the clutch brake's faces 58 and 60, as shown in FIG. 7.

Figure 14:
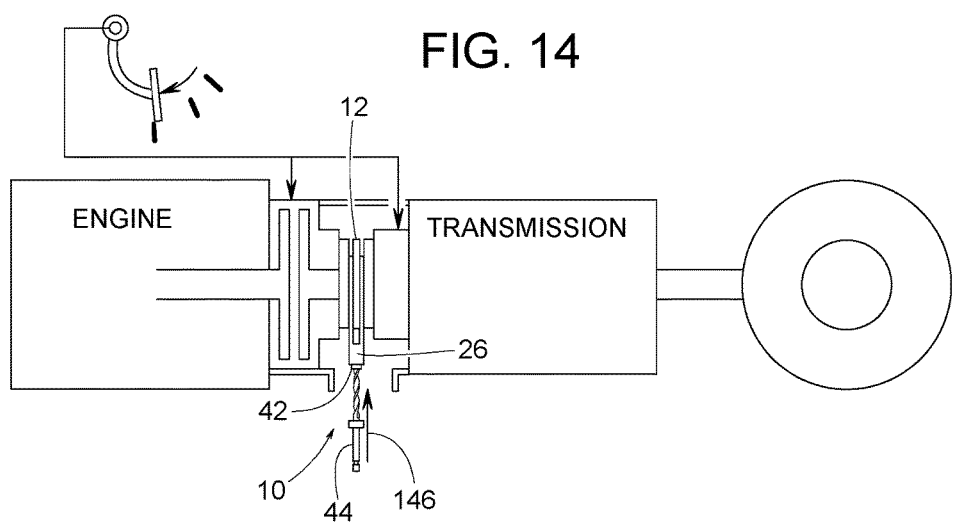
FIG. 14 is a schematic view similar to FIG. 13 but showing a drill bit creating a drilled hole in the clutch brake.

FIG. 14 shows drilling a first hole 132 radially into clutch brake 12 to begin the process of cutting clutch brake 12 into separate pieces. Drill bushing 42 initially guides drill bit 44 into the clutch brake's outer edge 66. In some examples, each plate 30 and 32 has an open slot 132 for checking the radial position of clutch brake 12 within clutch brake cutting tool 10 and for releasing chips from the drilling operation. Drill bushing 42 further guides drill bit 44 along a longitudinal centerline 134 of tool-receiving hole 28 such that drill bit 44 travels radially along a first path 136 (FIG. 15) toward the clutch brake's inner edge 70. When clutch brake cutter 10 is in the working position, as shown in FIG. 14, longitudinal centerline 134 lies substantially perpendicular to rotational axis 20 of shaft 18.

In some examples, the drill bit's cutting diameter 138 (FIG. 15) is less than the clutch brake's thickness 74, whereby drill bit 44 travels between the clutch brake's faces 58 and 60. In such examples, chisel 46 is later used in a follow-up cut that breaks through the clutch brake's faces 58 and 60. In other examples, the drill bit's cutting diameter 138 is greater than the clutch brake's thickness 74, whereby drill bit 44 itself breaks through the clutch brake's faces 58 and 60, and chisel 46 is not needed. It has been found, however, that the force required to push such a large drill bit through the clutch brake is high, making this operation difficult. Use of a smaller diameter drill bit (e.g., dimension 138 being about 5/16 in.) makes the drilling operation much easier yet still removes sufficient material so that chisel 46 can easily complete the cut. In some examples, a collar 140 can be fastened at an adjustable location on drill bit 44 to serve as a stop that prevents drilling into shaft 18.

Figure 21:
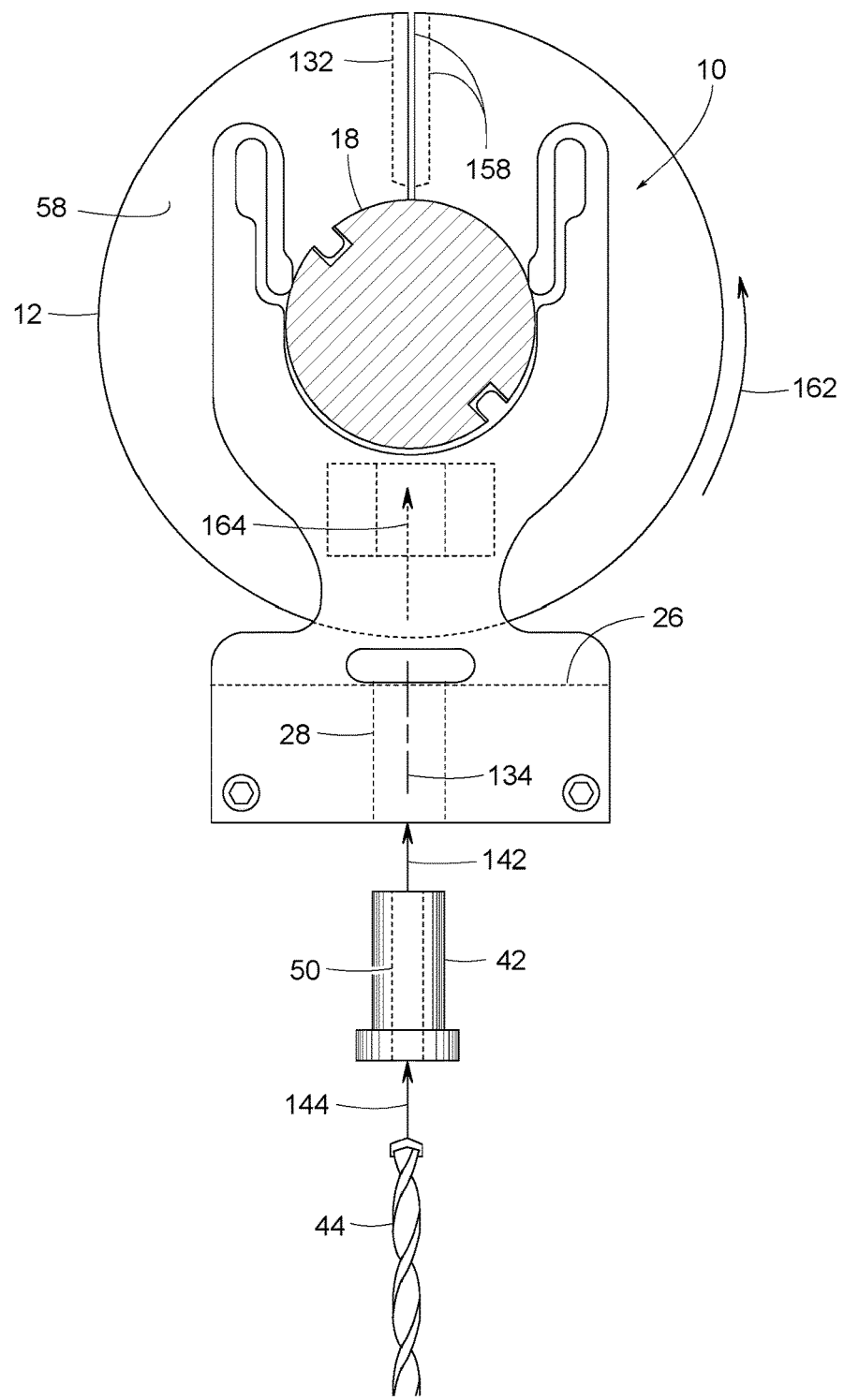
FIG. 21 is a schematic front face view showing the clutch brake and shaft being rotated relative to the clutch brake cutter in preparation for making a second cut through the clutch brake.

Arrow 142 of FIG. 21 represents inserting drill bushing 42 into tool-receiving hole 28 of main body 26. Arrow 146 of FIG. 14 and arrow 144 of FIG. 21 represents inserting drill bit 44 into drill bushing 42. Arrow 146 of FIG. 14 also represents creating first drilled hole 132 (FIGS. 15 and 18) by driving drill bit 44 in radial direction 25 while drill bushing 42 guides drill bit 44 through clutch brake 12 from outer edge 66 toward inner edge 70. FIG. 15 shows the completion of the drilling process illustrated in FIG. 14.

FIG. 16 shows the removal of drill bushing 42 and drill bit 44 in preparation for using chisel 46 to split open the first drilled hole 132. Arrow 148 (FIGS. 3 and 16) and arrow 150 (FIG. 16) respectively represent positioning drill bit 44 and drill bushing 42 so as to provide chisel 46 with clear access to tool-receiving hole 28 and the first drilled hole 132. Arrow 142 also shows drill bushing 42 being movable selectively to a drill position (FIGS. 1, 2, 4-7, and 11-15) for receiving drill bit 44 and to a chisel position (FIGS. 3 and 16) for tool-receiving hole 28 to receive chisel 46. In the drill position, drill bushing 42 extends into tool-receiving hole 28. In the chisel position, drill bushing 42 is spaced apart from tool-receiving hole 128.

Figure 18:
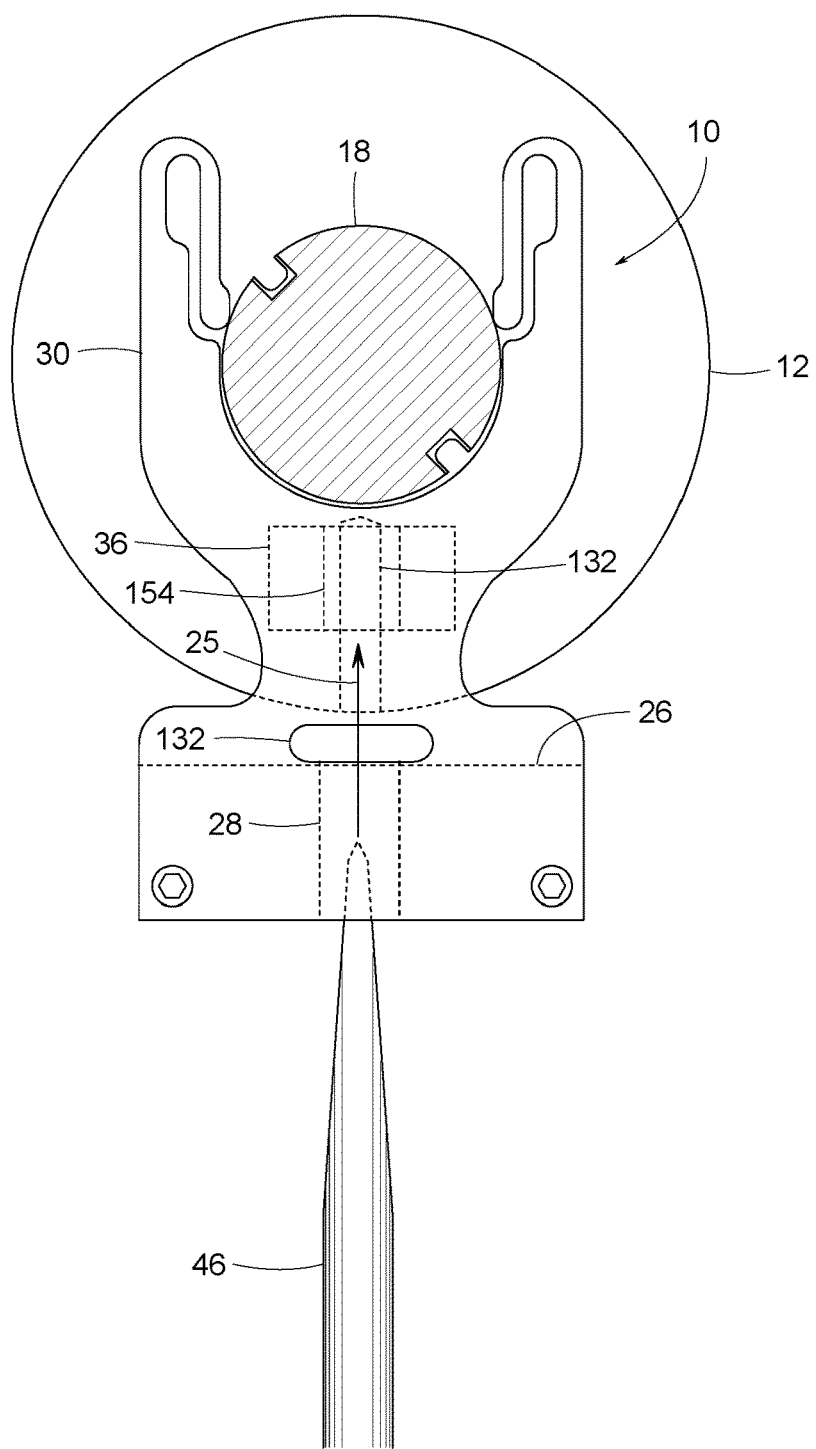
FIG. 18 is a front face view of the clutch brake cutter and the clutch brake shown in FIG. 17.

FIG. 17 shows chisel 46 being used for splitting open the first drilled hole 132. Chisel 46 has a cutting edge width 150 (FIG. 3) that is wider than the clutch brake's thickness 74 (FIG. 6). With drill bushing 42 removed, chisel 46 is inserted through tool-receiving hole 28 and driven into clutch brake 12 to split open the first drilled hole 132. Arrow 152 represents inserting chisel 46 into tool-receiving hole 28, driving chisel 46 in radial direction 25 through first drilled hole 132, and chisel 46 cutting the clutch brake's front face 58 and back face 60 upon chisel 46 being driven through first drilled hole 132. This chiseling operation is also illustrated in FIG. 18.

In some examples, as shown in FIGS. 4 and 5, first clamping surface 34 of first clamping pad 36 defines a first channel 154, and second clamping surface 38 of second clamping pad 40 defines a second channel 156. Channels 154 and 156 run substantially parallel to the tool-receiving hole's longitudinal centerline 134. Channels 154 and 156 help guide chisel 46 lengthwise along first drilled hole 132 and provide clearance for receiving clutch brake material that chisel 46 cuts and forces away from first drilled hole 132.

Alternatively, in some examples, chisel 46 itself does all of the cutting of clutch brake 12, whereby drill bit 44 and drill bushing 42 are not needed. However, without drill bit 44 and without first predrilled hole 132, substantial force would be needed to drive chisel 46 through clutch brake 12.

Figure 19:
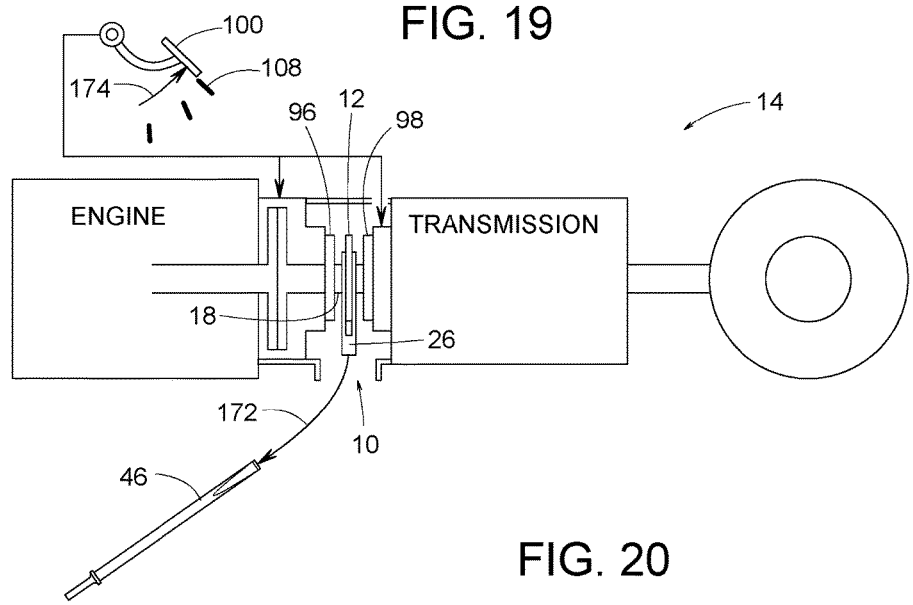
FIG. 19 is a schematic view similar to FIG. 17 but showing the chisel being removed and the clutch pedal being returned to its released position.
Figure 20:
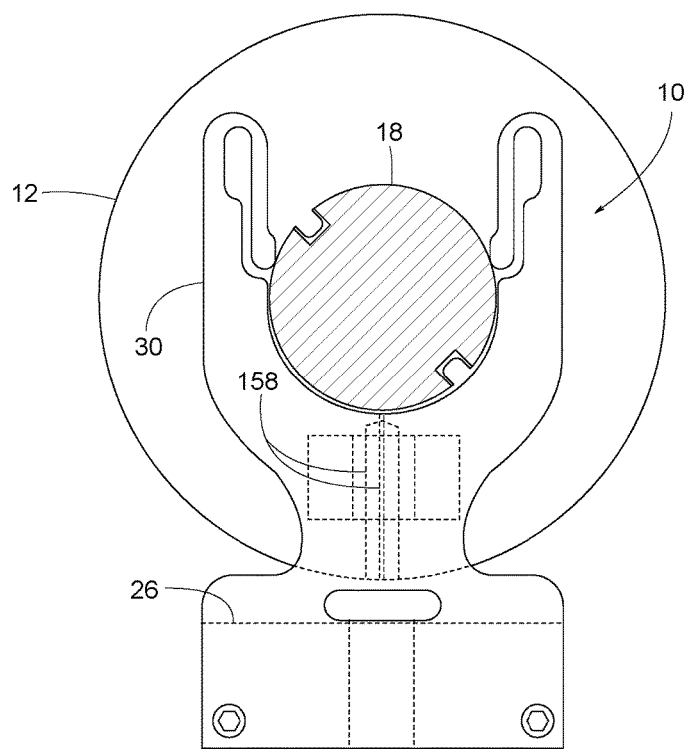
FIG. 20 is a front face view of the clutch brake cutter and the clutch brake after the cutting tools have made a first cut through the clutch brake.

FIG. 19 shows chisel 46 being removed after having split first drilled hole 132 open. This leaves clutch brake 12 with a first drilled and chiseled cut 158 as shown in FIG. 20. FIG. 19 also shows clutch pedal 100 released to its released position 108, which disengages clutch plates 96 and 98 from clutch brake 12. The disengagement allows clutch brake 12 and shaft 18 to be readily rotated about 180 degrees or at least 120 degrees relative to the clutch brake cutter's main body 26 for the purpose of making a second cut 160 (FIGS. 22 and 24) on clutch brake 12, whereby two cuts 158 and 160 about 180 degrees from each other allows clutch brake 12 to be readily split apart in two pieces and removed from shaft 18, as shown in FIG. 25. Arrow 162 of FIG. 21 represents moving main body 26 to a second position relative to clutch brake 12 (or vice versa, of course), wherein the first position is shown in FIGS. 15, 18 and 20; and the second position is shown in FIGS. 21 and 22.

After clutch brake 12 and the clutch brake cutter's main body 26 are configured to the second position of FIG. 21, drill bushing 42 is reinserted into tool-receiving hole 28, as represented by arrow 142, and drill bit 44 is inserted into drill bushing 42 and driven into clutch brake 12, as represented by arrow 164. Drill bit 44 then creates a second drilled hole 166 by repeating the steps used for creating first drilled hole 132. Likewise, chisel 46 can cut and split open second drilled hole 166 by repeating the steps used for chiseling first drilled hole 132.

After drilling and/or chiseling both first and second cuts 158 and 160, clutch brake cutter 10 is removed from clutch brake 12 in the reverse manner that clutch brake cutter 10 was installed, and clutch brake 12 is separated into at least two pieces 12a and 12b (FIG. 23) and then removed from shaft 18, as indicated by arrows 168 of FIG. 25. In examples where clutch brake 12 is a non-homogeneous assembly of multiple parts, such a clutch brake might fall apart in more than just two pieces.

In addition or alternatively, arrow 170 of FIG. 1, arrow 146 of FIG. 14, arrow 152 of FIG. 17, and arrow 25 of FIG. 18 represent inserting a cutting tool (e.g., drill bit 44 or chisel 46) through tool-receiving hole 28 of main body 42. Arrow 146 of FIG. 14, arrow 152 of FIG. 17, and arrow 25 of FIG. 18 further represent cutting clutch brake 12 along a first path 136 by forcing the cutting tool (e.g., drill bit 44 or chisel 46) in radial direction 25 into clutch brake 12 while shaft 18 and clutch brake 12 are at the first position (position shown in FIGS. 18 and 20). Arrow 150 of FIG. 16 and arrow 172 of FIG. 19 represent withdrawing the cutting tool (e.g., drill bit 44 or chisel 46) out from within clutch brake 12. Arrow 174 of FIG. 19 represents releasing clutch pedal 100 of vehicle 14, thereby substantially removing clamping force 128 against clutch brake 12. Arrow 162 of FIG. 21 represents rotating shaft 18 and clutch brake 12 to a second position. In addition to arrow 130 of FIG. 13 representing depressing clutch pedal 100 a first time, arrow 130 further represents depressing clutch pedal 100 a second time. Arrows 128 of FIG. 13 represents, in reaction to depressing clutch pedal 100 a second time, retransmitting clamping force 128 in axial direction 22 against front face 58 and back face 60 of clutch brake 12. Arrow 164 of FIG. 21 represents one example of cutting clutch brake 12 along a second path 164 by forcing a cutting tool (e.g., drill bit 44 or chisel 46) in radial direction 25 through tool-receiving hole 28 and into clutch brake 12 while shaft 18 and clutch brake 12 are at the second position. Arrows 168 of FIG. 25 represents removing clutch brake 12 from shaft 18.

Although certain example methods, apparatus and articles of manufacture have been described herein, the scope of the coverage of this patent application is not limited thereto. On the contrary, this patent application covers all methods, apparatus and articles of manufacture fairly falling within the scope of the appended claims either literally or under the doctrine of equivalents.

The invention claimed is:
1. A clutch brake method for removing the clutch brake of a vehicle, the clutch brake encircling a shaft having a rotational axis extending in an axial direction that is perpendicular to a radial direction, the clutch brake being generally an annular disk having a front face, a back face, an outer edge and an inner edge, the front face and the back face extending in the radial direction between the inner edge and the outer edge, the inner edge being adjacent to the shaft, the clutch brake method involving a use of a drill bit, a chisel, a drill bushing, and a main body having a tool-receiving hole, the clutch brake method comprising:
mounting the main body at a first position relative to the clutch brake;
inserting the drill bushing in the tool-receiving hole of the main body;
inserting the drill bit into the drill bushing;
creating a first drilled hole by driving the drill bit in the radial direction while the drill bushing guides the drill bit through the clutch brake from the outer edge toward the inner edge;
positioning the drill bit and the drill bushing so as to provide clear access to the tool-receiving hole and the first drilled hole;
inserting the chisel into the tool-receiving hole of the main body;
driving the chisel in the radial direction through the first drilled hole;
the chisel cutting at least one of the front face and the back face upon driving the chisel through the first drilled hole;
moving the main body to a second position relative to the clutch brake;
creating a second drilled hole by driving the drill bit in the radial direction while the drill bushing guides the drill bit through the clutch brake from the outer edge toward the inner edge;
positioning the drill bit and the drill bushing so as to provide clear access to the tool-receiving hole;
inserting the chisel into the tool-receiving hole of the main body;
driving the chisel in the radial direction through the second drilled hole;
the chisel cutting at least one of the front face and the back face upon driving the chisel through the second drilled hole;
withdrawing the main body from the clutch brake; and
removing the clutch brake from the shaft.
2. The clutch brake method of claim 1, further comprising passing the main body through an inspection opening of a clutch housing that contains both the clutch brake and the shaft.
3. The clutch brake method of claim 1, further comprising clamping the clutch brake by exerting a clamping force in the axial direction against the front face and the back face of the clutch brake.
4. The clutch brake method of claim 1, further comprising:
depressing a clutch pedal of the vehicle;
in reaction to depressing the clutch pedal, transmitting a clamping force in the axial direction against the front face and the back face of the clutch brake.
5. The clutch brake method of claim 1, wherein mounting the main body at a first position on the clutch brake involves resiliently coupling the main body to the shaft of the vehicle.
6. The clutch brake method of claim 1, wherein moving the main body to the second position involves rotating the clutch brake and the shaft at least 120 degrees about the rotational axis.
7. A clutch brake method for removing the clutch brake of a vehicle, the clutch brake encircling a shaft having a rotational axis extending in an axial direction that is perpendicular to a radial direction, the clutch brake being generally an annular disk having a front face, a back face, an outer edge and an inner edge, the front face and the back face extending in the radial direction between the inner edge and the outer edge, the inner edge being adjacent to the shaft, the clutch brake method involving a use of a clutch pedal of the vehicle, a cutting tool, and a main body having a tool-receiving hole, the clutch brake method comprising:
positioning the clutch brake at a first position;
placing the main body proximate the clutch brake;
depressing the clutch pedal of the vehicle;
in reaction to depressing the clutch pedal, transmitting a clamping force in the axial direction against the front face and the back face of the clutch brake;
inserting the cutting tool through the tool-receiving hole of the main body;
cutting the clutch brake along a first path by forcing the cutting tool in the radial direction into the clutch brake while the shaft and the clutch brake are at the first position;
withdrawing the cutting tool out from within the clutch brake;
releasing the clutch pedal of the vehicle, thereby substantially removing the clamping force against the clutch brake;
rotating the shaft and the clutch brake to a second position;
depressing the clutch pedal a second time;
in reaction to depressing the clutch pedal a second time, retransmitting the clamping force in the axial direction against the front face and the back face of the clutch brake;
cutting the clutch brake along a second path by forcing the cutting tool in the radial direction through the tool- receiving hole and into the clutch brake while the shaft and the clutch brake are at the second position; and removing the clutch brake from the shaft.

8. The clutch brake method of claim 7, further comprising resiliently coupling the main body to the shaft of the vehicle.

9. The clutch brake method of claim 7, wherein rotating the shaft and the clutch brake to the second position involves rotating the clutch brake and the shaft at least 120 degrees about the rotational axis.

10. The clutch brake method of claim 7, wherein the clutch brake and the shaft are contained within a clutch housing of the vehicle, and the clutch brake method further comprising:

removing an access cover from the clutch housing to open an inspection opening defined by the clutch housing; and moving the main body through the inspection opening prior to placing the main body proximate the clutch brake.

11. The clutch brake method of claim 10, further comprising:

temporarily attaching a handle to the main body;

using the handle to aide in moving the main body through the inspection opening; and after mounting the main body to the clutch brake and before cutting the clutch brake along the first path, removing the handle from the main body.

12. A clutch brake method for removing & the clutch brake of a vehicle, wherein the vehicle includes at least one of an engine block, a transmission housing and a clutch housing; the clutch brake encircling a shaft that is rotatable about a rotational axis extending in an axial direction, the shaft extending in the axial direction between the engine block and the transmission housing, the axial direction being perpendicular to a radial direction, the clutch brake being generally an annular disk having a front face, a back face, an outer edge and an inner edge, the front face and the back face extending in the radial direction between the inner edge and the outer edge, the inner edge being adjacent to the shaft, the clutch brake method involving a use of a cutting tool and a clutch brake cutter body having a tool-receiving hole, the clutch brake method comprising:

attaching the clutch brake cutter body to the clutch brake;

inhibiting rotation of the clutch brake cutter body relative to at least one of the engine block, the transmission housing and the clutch housing; and while inhibiting rotation of the clutch brake cutter body, inserting the cutting tool through the tool-receiving hole of the clutch brake cutter body and forcing the cutting tool in the radial direction into the clutch brake.

13. The clutch brake method of claim 12, wherein inhibiting rotation of the clutch brake cutter body involves fastening the clutch brake cutter body to the clutch housing.

14. The clutch brake method of claim 12, further comprising:

positioning the clutch brake cutter body axially between the engine block and the transmission; and while the clutch brake cutter body is positioned between the engine block and the transmission, clamping the clutch brake cutter body in the axial direction and thereby inhibiting rotation of the clutch brake cutter body relative to at least one of the engine block, the transmission housing and the clutch housing.

* * * * *